May 24, 1932. J. L. WILSON 1,860,345
APPARATUS FOR DETERMINING METACENTRIC HEIGHT
Filed Feb. 8, 1929 4 Sheets-Sheet 1
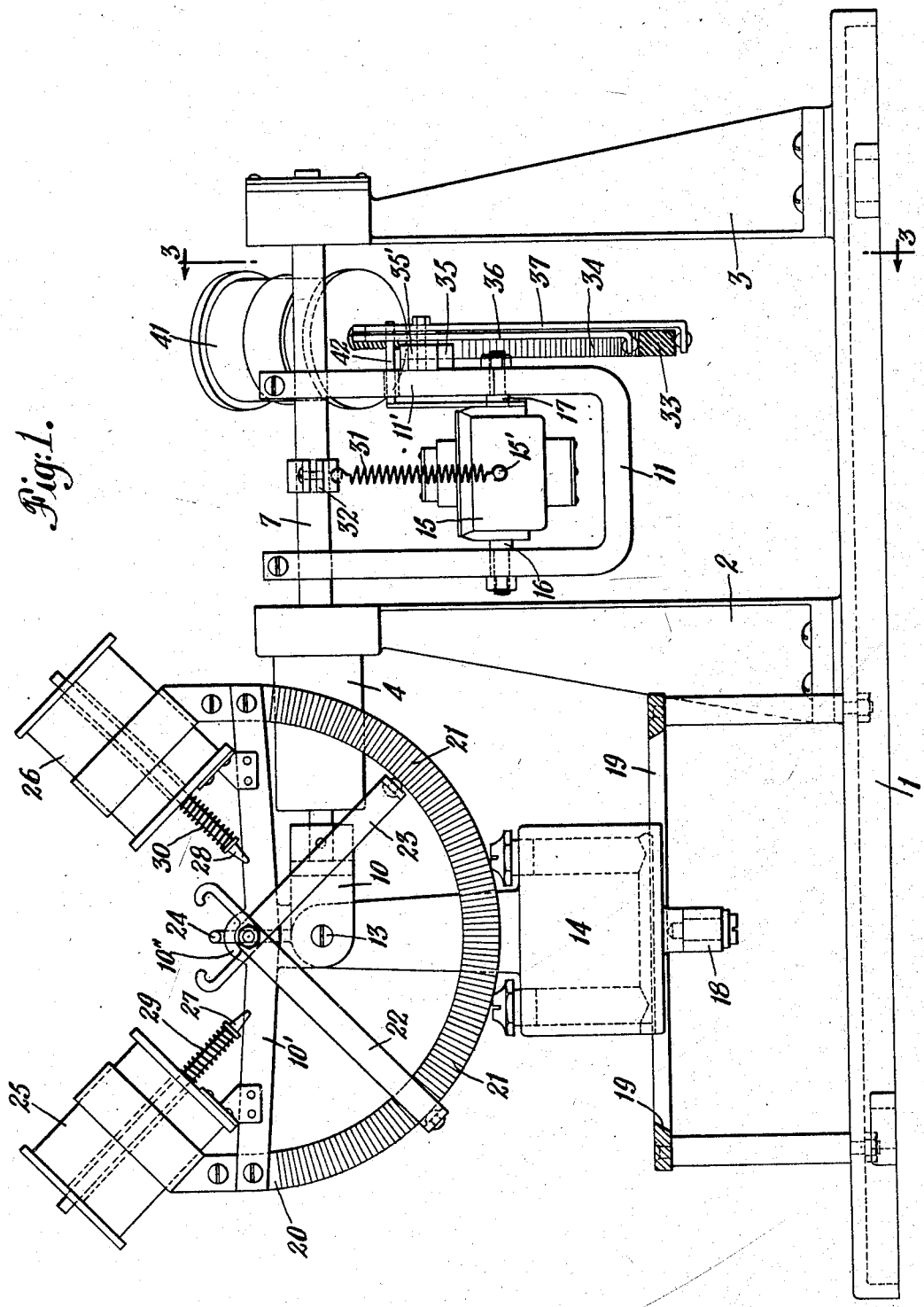
INVENTOR
*JOHN LYELL WILSON*
BY *E. C. Sanborn*
ATTORNEY

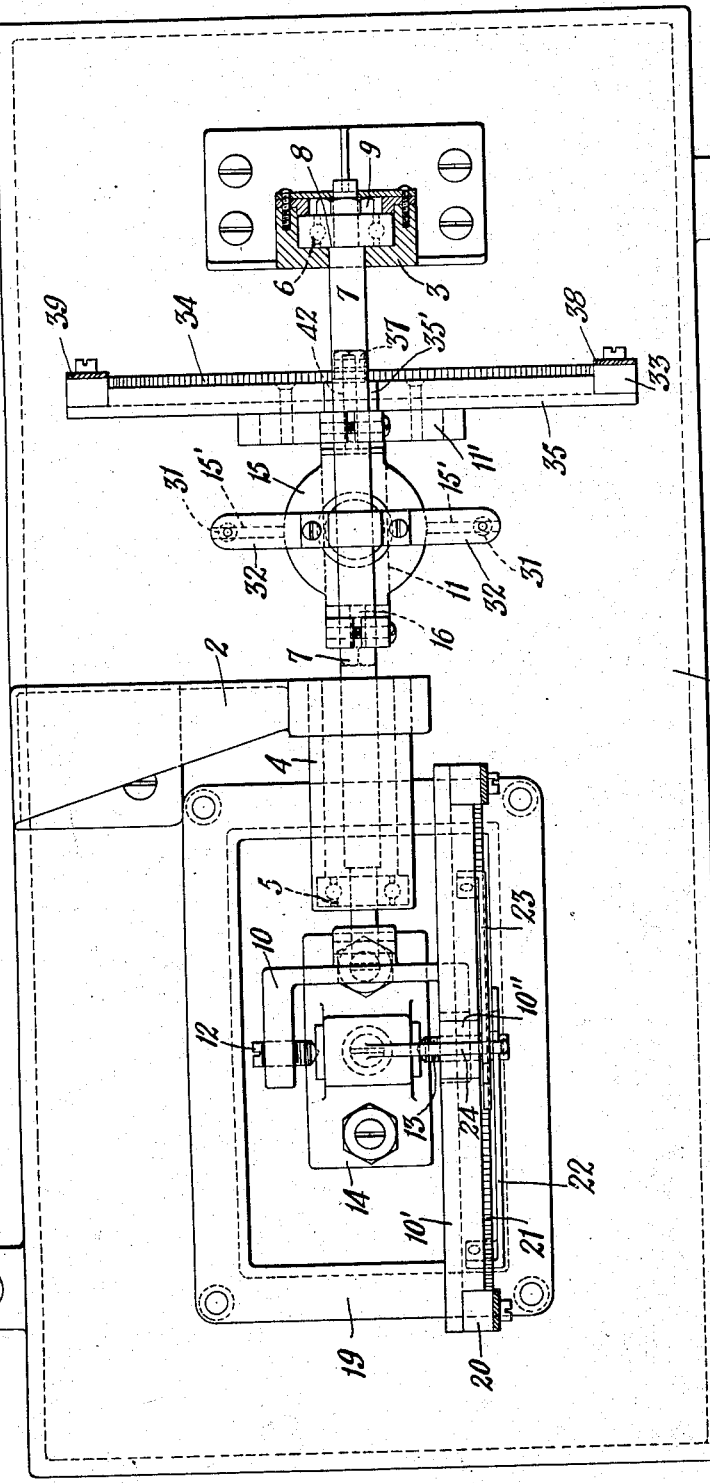

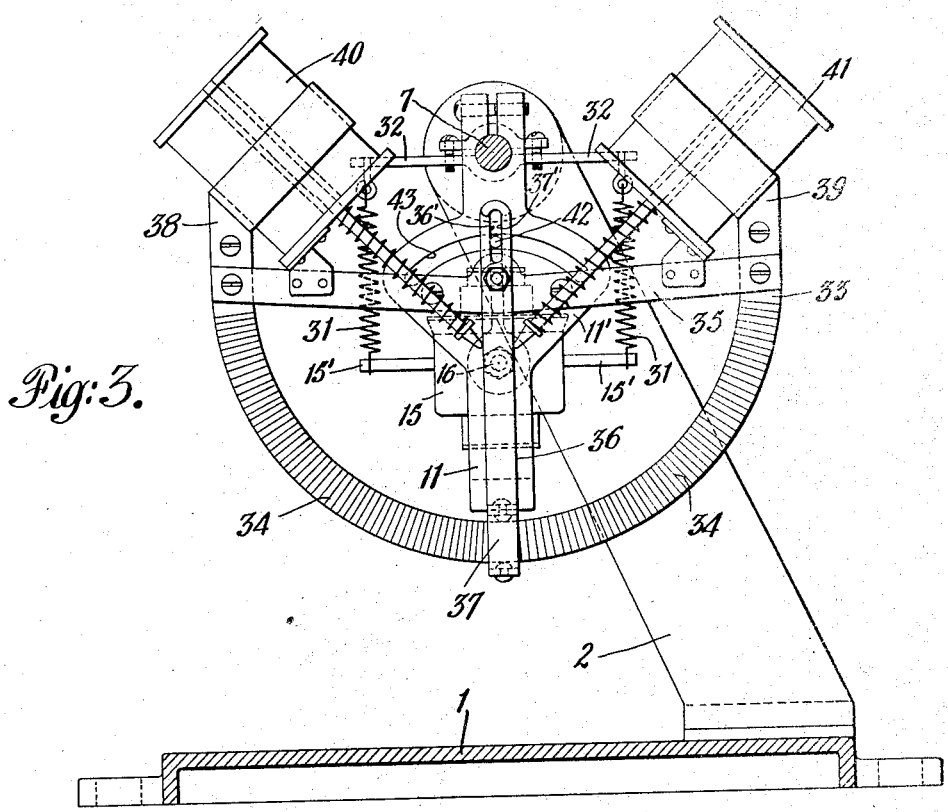
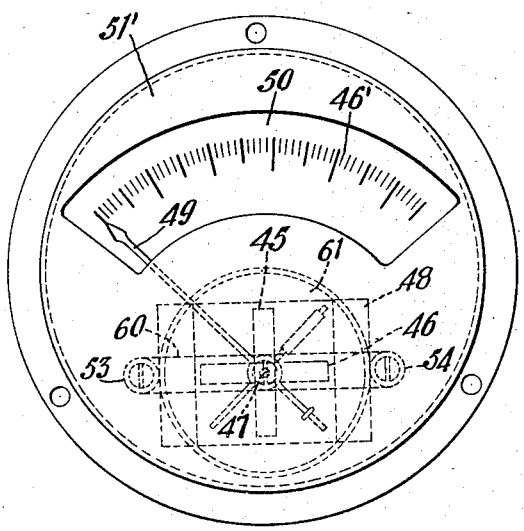
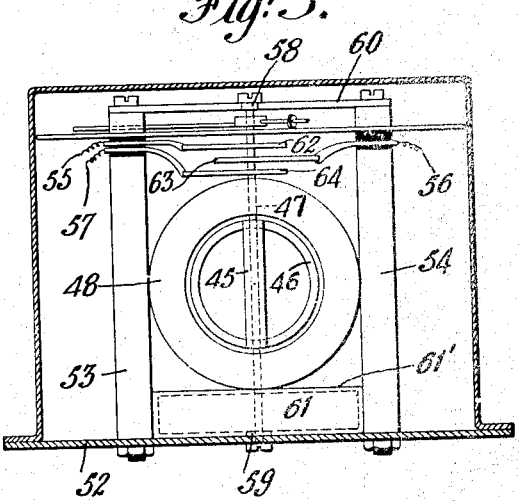

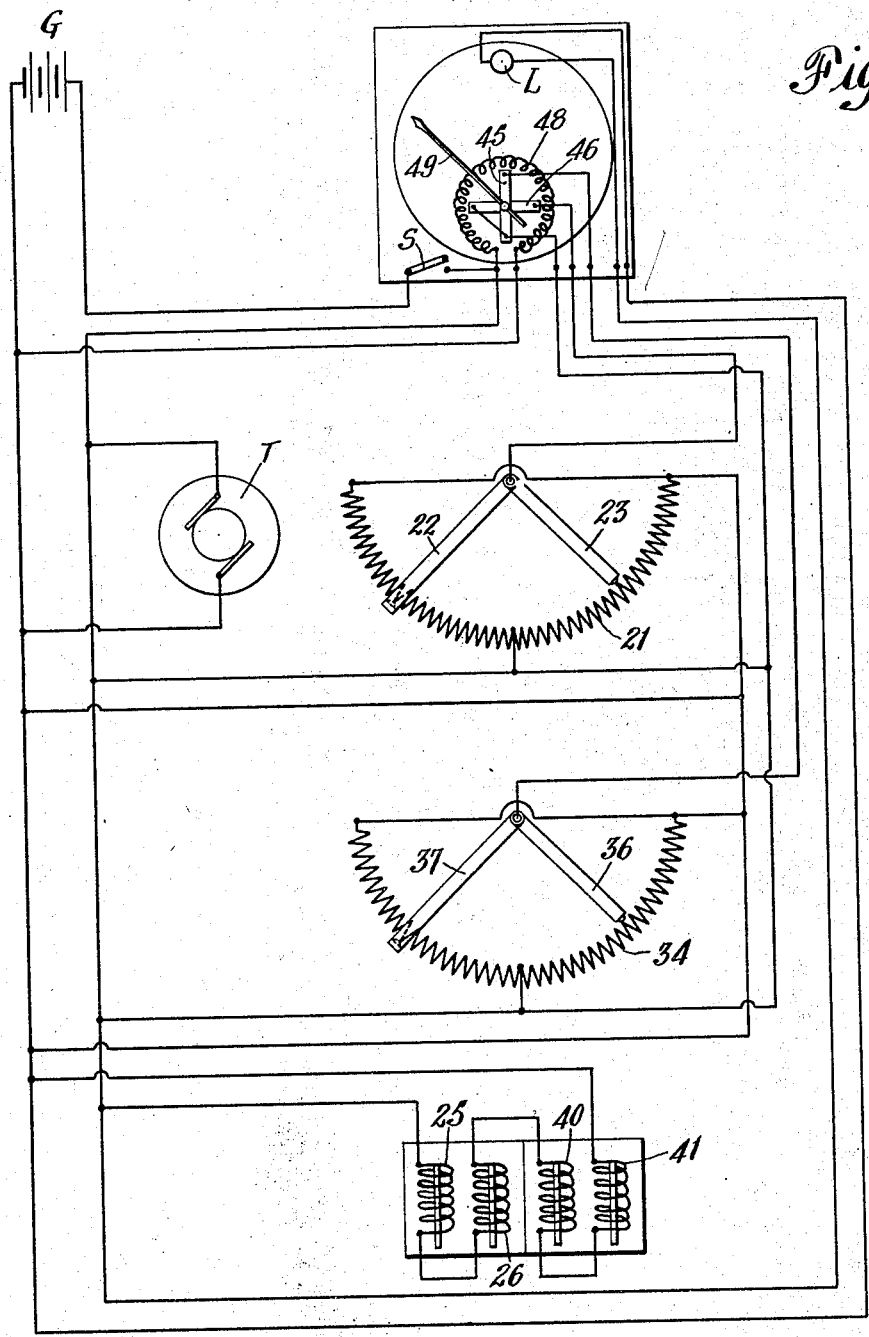
Fig: 6.

Patented May 24, 1932                                              1,860,345

UNITED STATES PATENT OFFICE

JOHN LYELL WILSON, OF BROOKLYN, NEW YORK, ASSIGNOR TO STABILITY METER CORPORATION, OF NEW YORK, N. Y., A CORPORATION OF NEW YORK

APPARATUS FOR DETERMINING METACENTRIC HEIGHT

Application filed February 8, 1929. Serial No. 338,426.

This invention has for its object the provision of a novel and improved apparatus for measuring the metacentric height of ships or similar bodies. As a preliminary to a description of a specific embodiment of the invention, it may be noted that I have discovered that the metacentric height may be determined from rolling or heeling movements of the ship by combining the maximum velocity of roll with the maximum angle of roll. This will be seen from a consideration of the following relations:

The moment required to impart the angular acceleration $$\frac{d^2\theta}{dt^2}$$

to the entire mass of a ship is given by:

$$\frac{d^2\theta}{dt^2}\int \rho^2 dm = \frac{I}{g}\frac{d^2\theta}{dt^2}$$

where, $dm$ is a unit mass at distance $\rho$ from an axis through the center of gravity of the ship, $I$ represents the moment of inertia of the ship about the same axis and weight of the ship about the same axis and $g$ is the acceleration due to gravity.

Now if $\rho_o$ is the radius of gyration of the ship about an axis through its center of gravity in feet and if $D$ is the vessel's displacement in tons, then $$I = \rho_o^2 D$$

and by equating the righting moment to the moment required to produce the angular acceleration (with due regard to signs since they are acting in opposite directions) we have $$D(r_o - a)\theta = -\rho_o^2 \frac{D}{g}\frac{d^2\theta}{dt^2}$$

whence, $$\frac{d^2\theta}{dt^2} = -\frac{g(r_o - a)\theta}{\rho_o^2} = -b^2\theta$$

where, $(r_o - a)$ is an expression for the metacentric height GM and $\theta$ is the angle of roll or heel; also in which $b$ is a constant for purposes of integration depending on the acceleration due to gravity and on the properties of the ship $(r_o - a)$ and $\rho_o$. By integrating that equation we get $$\int 2\frac{d\theta}{dt}\frac{d^2\theta}{dt^2} dt = -b^2 \int 2\theta d\theta$$

therefore $$\left(\frac{d\theta}{dt}\right)^2 = -b^2\theta^2 + C$$

where $C$ is the constant of integration the value of which is readily found because the ship comes to rest at the maximum angle of inclination $\theta_{max}$ and at that instant the angular velocity $$\frac{d\theta}{dt}$$

equals zero, so that $$C = b^2\theta^2_{max}$$

therefore $$\left(\frac{d\theta}{dt}\right)^2 = -b^2\theta^2 + b^2\theta^2_{max}$$

which is obviously a maximum when $\theta = 0$ whence maximum $$\frac{d\theta}{dt} = b\theta_{max}$$

therefore $$b = \frac{\left(\frac{d\theta}{dt}\right)_{max}}{\theta_{max}}$$

but $b$ is dependent upon the constant's acceleration due to gravity and the radius of gyration of the ship and upon the vessel's metacentric height, so that simplifying the equation in page 1, lines 42–43.

$$b^2 = \frac{g(r_o - a)}{\rho_o^2}$$

therefore $$(r_o - a) = \frac{\rho_o^2}{g}\left[\frac{\left(\frac{d\theta}{dt}\right)_{max}}{\theta_{max}}\right]^2$$

which means that the metacentric height equals a constant multiplied by the square of the ratio between the maximum velocity of a roll of the ship and the maximum angle of said roll; or, in other words, the metacentric height is proportional to the aforesaid square of the ratio between maximum velocity of roll and maximum angle of roll. In carrying out my invention I provide means settable in accordance with the maximum angular velocity of roll, means settable in accordance with the maximum angle of roll, and means controlled by the two first-mentioned means for indicating the metacentric height. A further feature comprised in the invention is the provision of means automatically responsive to the velocity and angle of roll for causing the setting of certain elements in accordance with the maximum velocity and maximum angle of roll, respectively. Other features of the invention will be hereinafter described and claimed.

One form of apparatus whereby the invention may be carried out is shown for purposes of illustration in the accompanying drawings, in which:—

Figure 1 is a front elevation of an embodiment of the invention, with cover removed, looking in a fore and aft or longitudinal direction with respect to the vessel on which it might be placed;

Figure 2 is a plan view, with cover removed and certain parts omitted, of the same embodiment shown in Figure 1;

Figure 3 is a sectional view on line 3—3 of Fig. 1;

Figure 4 is a plan view of the electrical indicating device, and

Figure 5 is a view in front elevation of the interior mechanism of the indicating device, the casing being shown in section; and Figure 6 is a diagrammatic illustration of the electrical wiring and connections of the instrument and electrical indicating device.

The apparatus which I have disclosed comprises a gyroscope and a pendulum, the gyroscope being responsive to rolling movement of the vessel and being so arranged as to precess an extent commensurate with the angular velocity of roll. For example, in the embodiment shown herein, the gyroscope is suspended on transverse trunnions and with its axis of spin normally vertical and free to oscillate (but restrained from doing so by springs) in a longitudinal direction with respect to the vessel so that the transverse rolling of the vessel will cause precession of the gyroscope. The angular velocity of rolling, and hence precession of the gyroscope, will be measured by the amount of pressure on the bearings of the gyroscope, which will be proportional to the amount of extension of the restraining springs caused thereby. In other words, the extent of oscillation of the gyroscope against the restraint of the springs will be proportional to the velocity of rolling of the vessel. The indication of the maximum value of this angular velocity of rolling is combined with that of the maximum angle of roll or amplitude on each side of the mean vertical, which is given by the pendulum, and the resultant ratio of these maxima will serve to indicate the vessel's metacentric height.

Referring to Fig. 1 it will be seen that the mechanism there shown is mounted upon a common base member 1 provided with pedestal members 2 and 3; one of which pedestal members (2) is fitted with a tubular extension 4 carrying ball bearing member 5, and the other of which (3) is fitted to carry a similar ball bearing member 6. Said ball bearing members 5 and 6 are arranged to carry the operating mechanism of Fig. 1 by way of the transverse shaft member 7 which is locked with a shoulder 8 and nut 9 to the middle or inner race of ball bearing member 6. Said shaft 7 is also mounted in the inner race of ball bearing member 5 but is adapted to slide therein so that expansion or contraction of the shaft as the result of temperature changes will not cause binding or interfere with free rotation of the shaft in its bearings.

A pendulum yoke member 10 is securely fastened on one end of shaft 7, and a gyroscope saddle member 11 is securely clamped to said shaft between the pedestal members 2 and 3. The yoke 10 carries, through pivot bearing members 12, 13, a pendulum 14, which may be internally damped. The saddle member 11 is arranged to carry a gyroscope casing 15 containing a gyro wheel having its axis of spin normally vertical, said casing being mounted in said saddle member on an athwartship axis through pivot bearings 16 and 17. The yoke 10 and saddle member 11 are so mounted on shaft 7 that both the axis of pendulum 14 and the gyroscope pivot bearings will all be in a common plane; and thus the entire working mechanism can oscillate freely in a fore and aft direction with respect to the vessel, being restrained only by the contact of stop member 18 at the lower end of the pendulum with stop ring member 19 secured to the ship. Hence the mechanism will be unaffected by trim, pitching, or other fore and aft motion of the vessel within the limits set by the stop ring member 19.

The pendulum yoke member 10 is also formed with an extension 10' to provide mounting means for attaching a quadrant of insulating material 20 which is wound with resistance wire in the form of a double potentiometer member 21. Also said yoke member is provided with a portion 10" forming a bearing for contact arms 22 and 23, the contacts at the extremities of which are arranged to slide over the outside and inside faces of the potentiometer windings 21 respectively. The contact arms 22 and 23 are actuated in scissors fashion about their common bearing center by means of a projecting pointer arm 24 integral with or rigidly attached to the top of pendulum 14 and arranged to project through and between the half-slotted upper extensions of arms 22 and 23 so that the latter will be pushed outward from their neutral upright position and each be left in an inclined position, such as illustrated in Fig. 1, corresponding by proportion to the maximum angle of relative swing between the ship and pendulum. In other words, the positions of the contact arms 22 and 23 correspond proportionately to the maximum angle of rolling or heeling movement of the ship. Electrical solenoid members 25 and 26 are so arranged that their core rods 27 and 28 are held back against the compression of springs 29 and 30 when the instrument is in operation by completing the electrical circuit through the solenoids 27 and 28 simultaneously or otherwise with means later described for setting the instrument functioning and so that when operation is discontinued the core rods 27 and 28 will be released from the action of the solenoids by breaking of the circuit therethrough, and will be forced by the springs 29 and 30 against contact arms 22 and 23 respectively, thereby resetting said arms against the projecting pointer arm 24 until the instrument is again set in operation.

As has been noted the saddle member 11 carries the gyroscope casing 15 wherein is mounted a motor driven gyro wheel having its axis of spin normally vertical, the casing being mounted in the saddle member through bearings 16 and 17 on an athwartship axis, so that the gyroscope may oscillate about said bearings in a fore and aft direction but is restrained from doing so freely by means of tension springs 31 which are each attached at one end to a corresponding projection 15' on the front and back respectively of the gyro frame or casing 15, and at the other end to the corersponding extremity of the cross bar 32 which is rigidly clamped in a normally horizontal fore and aft position on the shaft 7. A second potentiometer quadrant 33 wound similarly to quadrant 20, with resistance wire 34, is arranged to be carried on saddle member 11 by means of the supporting bar or member 35 which is secured to said saddle member. Bar 35 also provides through extension 35' thereof a bearing for contact arms 36 and 37, and furthermore by means of clamps 38, 39 said member 35 is arranged to support solenoids 40, 41. The latter cooperate with the contact arms 36 and 37 in the same way that the solenoids 25, 26 cooperate with the respective contact members 22, 23.

The contact arms 36, 37 are arranged to form sliding contacts on the inner and outer faces, respectively, of potentiometer winding 34, and are actuated in scissors fashion by means of a projecting pointer 42 rigidly attached to or integral with the gyroscope frame or casing 15, and projecting through an arcuate slot 43 formed in an extending portion 11' of the saddle member 11. Said pointer 42 extends between the half-slotted upper portions 36' and 37' of the contact arms 36, 37, so that as the gyroscope precesses against the action of the springs in response to rolling or heeling of the ship, the contact arms 36, 37 will be pushed upward from their neutral upright position, such as illustrated in Figure 2, and each will be left in an inclined position corresponding by proportion to the maximum oscillation or precession of the gyroscope against the tension of springs 29 and 30.

It will thus be seen that the maximum amplitude of oscillation of the gyroscope will be shown by the relative amount of angular displacement of each of the contact arms 36, 37 from neutral or upright position, and that as a result of the fundamental relations between moment and precessional characteristics of the gyroscope, said angular displacement of the contact arms may be used to indicate the value of the maximum velocity of roll or heel of the vessel. If then the double potentiometers are properly wired and a similar potential applied to each, it is apparent that the relative positions of the arms 36, 37 on quadrant 33 and those of arms 22, 23 on quadrant 20 will be susceptible of a measurement electrically by measuring the ratio of the resultant voltages through such resistances as are given by the arm positions.

Referring to Figure 4, which is an embodiment in modified form of a power factor meter, the coil members 45 and 46 are secured to a shaft 47 so that they are at right angles to each other. Said coil members are furthermore separate and insulated from each other except that they are connected to a common return wire as indicated in Fig. 6. Said coils, moreover, are situated as shown so as to rotate with the shaft 47 within the internal magnetic field of a solenoid 48. It is apparent that if solenoid 48 is electrically excited from a given source of potential and if separate voltages are applied to coils 45 and 46, the latter will take up an angular position with respect to the axis of solenoid 48 which will bear a definite relation to the values of separate voltages applied to coils 45 and 46. The value of this resultant is indicated by the position of pointer 49 fixed to shaft 47 and arranged to sweep over dial 50 which is supported in case 51 on base 52 by means of standards 53 and 54 arranged to support all the internal mechanism as shown in Figure 5. The latter figure also shows the contact leads 55, 56, and 57 to coils 45 and 46, one of said contacts being common to both coils. The pointer shaft 47 is mounted in jewel bearings 58 and 59, the first of which is carried on yoke 60 on standards 53 and 54, and the second in the base 52. Pointer shaft 47 may be provided with means for dampening the movements thereof such as illustrated by rotor 61 rotating in casing 61′ and with balanced spiral contact springs 62, 63, and 64 to carry the current from contacts 55, 56, and 57 respectively to the coils 45 and 46.

Thus, it will be seen that the electrical indicating device illustrated in Figures 4 and 5 will show the resultant ratio between the voltages impressed on the rotating coils 45 and 46 and if properly connected to the potentiometer quadrants previously described will indicate the ratio between the maximum velocity of roll and the maximum angle of that roll. Hence, by suitably calibrating the scale 46′, the metacentric height or GM of the vessel will be shown directly by said indicator.

Referring to Figure 6 there are shown diagrammatical electrical connections which may be employed from a source of power G to the various elements in the instrument and the indicating device. It will be noted that the various members are numbered to correspond with the numbers applied thereto in Figures 1–5 so that they may be readily identified. In addition the letter S refers to a switch and L to an illuminating lamp. The wiring diagram will, it is believed, be readily understood without further description. The letter T refers to the gyro motor.

In the use of applicant's device, the gyroscope rotor is brought to the desired speed of rotation and the device is permitted to remain in operation for as short or as long a time as desired, so long as it is in action during one complete roll of the ship. The maximum velocity and angle in one roll suffice for an indication of the metacentric height of the ship though, of course, if the device is in action for a number of rolls, results of greater accuracy may be obtained, since the greater the values of velocity and amplitude the more accurate is the ratio between them. The metacentric height is shown by the pointer 49 in conjunction with the scale 46′.

Power factor meters of the type hereinbefore referred to, involving a pair of coils attached to a pointer-bearing shaft at right angles to each other and movable in the magnetic field of a solenoid to bring said pointer to a position commensurate with the ratio of the voltages impressed upon said coils, are well known; such a meter being shown, for example, in "Standard Handbook for Electrical Engineers", (p. 161, Sec. 3, paragraph 183) published in 1922 by McGraw Hill Book Company, Inc. The power factor meter designated as Model 215 in the catalog, fifth edition, dated September, 1928, of the Weston Electrical Instrument Corporation of Newark, N. J., is another example of the type of power factor meter which may be employed in conjunction with this invention.

In lieu of a plurality of contact arms and a double potentiometer, a single contact arm and a single potentiometer may be employed in conjunction with the pendulum 14, whereby the maximum amplitude of roll on one side only of neutral position may be obtained; though it may be noted that through the use of two contact arms, as shown, in combination with a double potentiometer, the angular displacement of the two arms affords an indication of the mean or average maximum angle of roll. Likewise, if desired, a single contact arm in combination with a single potentiometer winding may be employed in conjunction with the gyro casing 15. Various other modifications are possible whereby the maximum angle of roll and maximum angular velocity of roll may be obtained and combined in the desired manner.

In accordance with the provision of the patent statutes, I have herein described the principle of my invention together with the best mode in which I have contemplated applying such principle, but I desire to have it understood that the apparatus shown is only illustrative and that the kind of apparatus and mode of operation employed may be considerably varied without departing from the spirit of my invention.

What I claim is:

1. In an apparatus of the character described, means responsive to the rate of rolling movement of a body, means responsive to the angle of roll, an indicator and means connecting said two first mentioned means with said indicator for causing the latter to indicate the metacentric height of the body.

2. In an apparatus of the character described, means automatically movable in accordance with the rate of rolling movement of a body, means automatically movable in accordance with the angle of roll, an indicator, and means for causing operation of the indicator to show metacentric height, said means comprising elements set by the two first mentioned means respectively, and electrical connections controlled by said elements.

3. In an apparatus of the character described, a movable element, means responsive to the rate of rolling movement of a body for automatically setting said element to a position commensurate with the maximum velocity of said rolling movement, a second movable element, means for automatically setting said second movable element in accordance with the maximum angle of said movement, an indicator, and means controlled by both said elements for causing said indicator to indicate the metacentric height of said body.

4. In an apparatus of the character described, gyroscopic means responsive to the rate of rolling movement of a body, means responsive to the angle of roll, an indicator and means connecting said two first mentioned means with said indicator for causing the latter to indicate the metacentric height of the body.

5. In an apparatus of the character described, gyroscopic means responsive to the rate of rolling movement of a body, means shiftable by said gyroscopic means to a position corresponding with the maximum rate of the rolling movement, means automatically shiftable to a position corresponding with the maximum angle of roll, and indicating means jointly controlled by said two shiftable means for showing the metacentric height of said body.

6. In an apparatus of the character described, gyroscopic means responsive to the velocity of roll of a body, an indicator, and means cooperating with said indicator and said gyroscopic means for causing the metacentric height of the body to be indicated.

7. In an apparatus of the character described, a gyroscope responsive to the angular velocity of rolling movement of a body, means cooperating with said gyroscope and settable thereby into a position commensurate with the maximum angular velocity of said rolling movement, means including a pendulum settable into a position commensurate with the maximum angle of said rolling movement, and indicating means controlled by the two first mentioned means in accordance with the ratio between the maximum angular velocity of roll and the maximum angle of roll.

8. In an apparatus of the character described, a gyro responsive to the angular velocity of rolling movement of a body, an element settable by precession of said gyroscope in accordance with the maximum velocity of roll of the body on one side of its neutral position, a pendulum, an element settable by said pendulum in accordance with the maximum angle of roll on one side of the neutral position of said body, an indicator, and connections to said indicator controlled by said elements.

9. In an apparatus of the character described, a gyro responsive to the angular velocity of rolling movement of a body, an element settable by precession of said gyro in accordance with the maximum velocity of roll of the body on one side of its neutral position, a pendulum, an element settable by said pendulum in accordance with the angle of roll on one side of the neutral position of said body, an electrical winding cooperating with the first mentioned element, an electrical winding cooperating with the second mentioned element, and indicating means jointly controlled by said elements through said windings.

10. Means for measuring the metacentric height of a vessel, said means comprising a gyroscope so mounted as to precess in accordance with the angular velocity of roll, and an element settable by said gyroscope in accordance with the maximum velocity of said roll.

In testimony whereof, I have signed my name to this specification this 6th day of February, 1929.

JOHN LYELL WILSON.